(12) United States Patent
Salcher

(10) Patent No.: US 10,487,793 B2
(45) Date of Patent: Nov. 26, 2019

(54) METHOD FOR MOUNTING A GUIDE APPARATUS

(71) Applicant: VOITH PATENT GMBH, Heidenheim (DE)

(72) Inventor: Gebhard Salcher, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 239 days.

(21) Appl. No.: 15/554,608

(22) PCT Filed: Feb. 5, 2016

(86) PCT No.: PCT/EP2016/052471
§ 371 (c)(1),
(2) Date: Aug. 30, 2017

(87) PCT Pub. No.: WO2016/139026
PCT Pub. Date: Sep. 9, 2016

(65) Prior Publication Data
US 2018/0017034 A1    Jan. 18, 2018

(30) Foreign Application Priority Data
Mar. 2, 2015 (DE) .......................... 10 2015 203 630

(51) Int. Cl.
*F03B 3/18* (2006.01)
*F03B 3/00* (2006.01)
*F03B 3/12* (2006.01)
(Continued)

(52) U.S. Cl.
CPC ................. *F03B 3/18* (2013.01); *F03B 3/00* (2013.01); *F03B 3/02* (2013.01); *F03B 3/06* (2013.01);
(Continued)

(58) Field of Classification Search
CPC ..... F01D 5/02; F01D 5/18; F01D 1/32; F01D 5/048; B64C 11/24; B64C 11/005;
(Continued)

(56) References Cited

U.S. PATENT DOCUMENTS 1,688,736 A   10/1928 Moody
2,077,883 A    4/1937 Hand
(Continued)

FOREIGN PATENT DOCUMENTS

CN       101418561 A    4/2009
DE    102012018066 A1    3/2014
(Continued)

*Primary Examiner* — Rick K Chang
(74) *Attorney, Agent, or Firm* — Laurence A. Greenberg; Werner H. Stemer; Ralph E. Locher

(57) ABSTRACT

A method of mounting a guide apparatus of a large hydraulic machine with a vertical axis of rotation and wherein the axes of the guide blades extend vertically as well. The method includes the following steps: assembling an assembly with at least the upper guide wheel ring or the turbine cover and all the guide blades of the guide apparatus. This assembly does not take place in the machine shaft and the guide blades are mounted in a suspended manner, lowering the guide blades to mutually different height levels within the assembly such that the lowered guide blades can be displaced upwardly, installing the lower guide wheel ring in the machine shaft, and installing the assembly in the machine shaft by continuous lowering, wherein the guide blades present in the assembly are successively inserted into the openings provided in the lower guide wheel ring.

6 Claims, 6 Drawing Sheets

(51) Int. Cl.
*F03B 3/16* (2006.01)
*F03B 3/02* (2006.01)
*F03B 3/06* (2006.01)

(52) U.S. Cl.
CPC ............... *F03B 3/128* (2013.01); *F03B 3/16* (2013.01); *F05B 2220/32* (2013.01); *F05B 2230/60* (2013.01); *F05B 2230/604* (2013.01); *F05B 2230/61* (2013.01); *Y02E 10/223* (2013.01); *Y02P 70/525* (2015.11)

(58) Field of Classification Search
CPC .... B23P 15/006; B23P 2700/01; F04D 29/30; F05D 2250/313; F05D 2220/30; F05D 2250/71
See application file for complete search history.

(56) References Cited

U.S. PATENT DOCUMENTS

| | | | | |
|---|---|---|---|---|
| 4,120,213 | A * | 10/1978 | Levy | F16H 47/085 475/53 |
| 4,227,855 | A * | 10/1980 | Flynn | F01D 5/043 415/218.1 |
| 6,402,467 | B1 * | 6/2002 | Godichon | F04D 29/023 415/200 |
| 7,785,098 | B1 * | 8/2010 | Appleby | B29C 33/302 264/319 |
| 8,602,653 | B2 * | 12/2013 | Heshmat | B23Q 1/70 384/103 |
| 8,998,581 | B2 * | 4/2015 | Giovannetti | F04D 29/023 416/180 |
| 9,206,309 | B2 * | 12/2015 | Appleby | B22C 9/04 |
| 9,328,717 | B1 * | 5/2016 | Walker | F03D 3/005 |
| 2003/0235272 | A1 * | 12/2003 | Appleby | B29C 33/302 378/147 |

FOREIGN PATENT DOCUMENTS

| | | |
|---|---|---|
| EP | 0561619 A1 | 9/1993 |
| JP | S55160171 A | 12/1980 |
| JP | S58176476 A | 10/1983 |
| JP | 2006348960 A | 12/2006 |

* cited by examiner

METHOD FOR MOUNTING A GUIDE APPARATUS

BACKGROUND OF THE INVENTION

Field of the Invention

The invention relates to a method for mounting a guide apparatus of a large hydraulic machine with a vertical rotational axis, wherein the axes of the guide vanes extend parallel to the rotational axis, i.e. also extend vertically. The hydraulic machine may be a turbine of the Francis or Kaplan type. Propeller turbines can also be equipped with such a guide apparatus. Pumps and pump-turbines also fall into the field of application of the present document. For illustration of the guide apparatus which is affected by the invention reference is made for example to documents U.S. Pat. No. 1,688,736 (in relation to a Francis turbine) and U.S. Pat. No. 2,077,883 (in relation to a Kaplan turbine).

The method for mounting such a guide apparatus according to the prior art comprises the following steps in the stated sequence: providing the powerhouse with a machine shaft and with the fastening points for installing the guide apparatus, installing the lower guide wheel ring, installing the guide vanes in succession in the lower guide wheel ring, installing the rotor wheel, installing the upper guide wheel ring or the turbine cover, and installing the control mechanism. In a particular case, the stated steps are carried out in a different sequence. It is essential for the understanding of the present invention that according to the prior art the construction of the guide apparatus is carried out from the bottom upward (i.e. beginning with the lower guide wheel ring, the individual guide vanes are installed in succession in this) and in the machine shaft.

The method according to the prior art has the following disadvantages: required for all lifting operations which are required in the stated method steps is the powerhouse crane which is the only lifting device which can be used in the machine shaft. A major cost factor with this is particularly the fetching (e.g. from the store or place of delivery) and the lifting into position of the individual guide vanes since a guide apparatus is constructed from a large number of guide vanes. In this way, the powerhouse crane is blocked for a long time and cannot be used for other lifting operations which are also required. As a result, considerable waiting times ensue, which overall delay the installation of the power plant.

For guide vane apparatus with guide vanes, the rotational axis of which is inclined to the rotational axis of the turbine, another method for mounting is known (cf. DE 10 2012 018 066 A1). In this case, a subassembly which comprises the upper guide wheel ring or the turbine cover and all the guide vanes of the guide apparatus is first of all erected, wherein the assembly does not take place in the machine shaft and the guide vanes are mounted in a suspended manner. After installing the lower guide wheel ring in the machine shaft, the preassembled subassembly consisting of guide wheel ring/turbine cover and guide vanes is installed in the machine shaft by continuous lowering.

Since a guide apparatus usually comprises a large number of guide vanes which are arranged in a distributed manner on a large diameter, the lowering of the stated subassembly and threading of the guide vanes into the provided openings in the lower guide wheel ring constitutes a not insignificant challenge and usually requires a great deal of time and/or costly centering devices.

SUMMARY OF THE INVENTION

The inventor has set himself the task of disclosing a method for mounting a guide apparatus which avoids the stated disadvantages and therefore enables a curtailment or simplification of the installation time of the power plant.

According to the invention, this object is achieved by means of a method as claimed. Further advantageous embodiments of the method according to the invention result from the dependent claims.

The inventor has been guided by the idea that the powerhouse crane is to be used for as few lifting operations as possible during the construction of the guide apparatus. The inventor achieves this by the guide apparatus first of all being assembled into a subassembly which comprises at least the upper guide wheel ring or the turbine cover and all the guide vanes. As an option, the control mechanism of the guide apparatus can also be added. This assembly is carried out outside the machine shaft and can for example be carried out at a preassembly location. For this purpose, the upper guide wheel ring or the turbine cover is placed on load support trestles which in height are sufficient in order to be able to introduce the guide vanes from the bottom. The control mechanism can then be mounted. In all these assembly steps, with the exception of the first step (propping up of the upper guide wheel ring or the turbine cover), the powerhouse crane is not required since other lifting devices, which are present at the preassembly location, are made available for this. In the machine shaft, however, only the powerhouse crane can be used.

DESCRIPTION OF THE INVENTION

Figure 1:
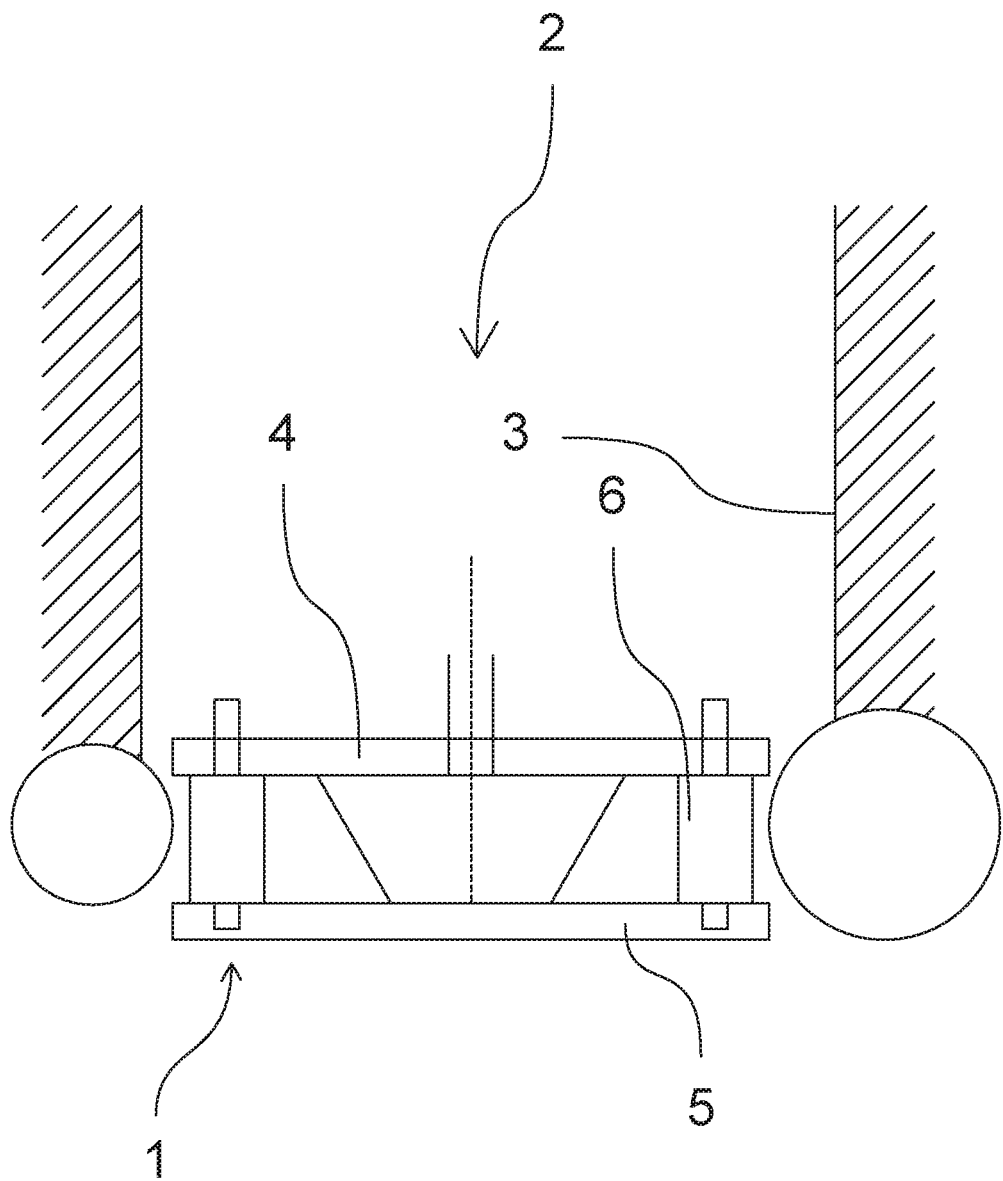
FIG. 1 is a schematic view of a large hydraulic machine with a guide apparatus in a machine shaft.
Figure 2:
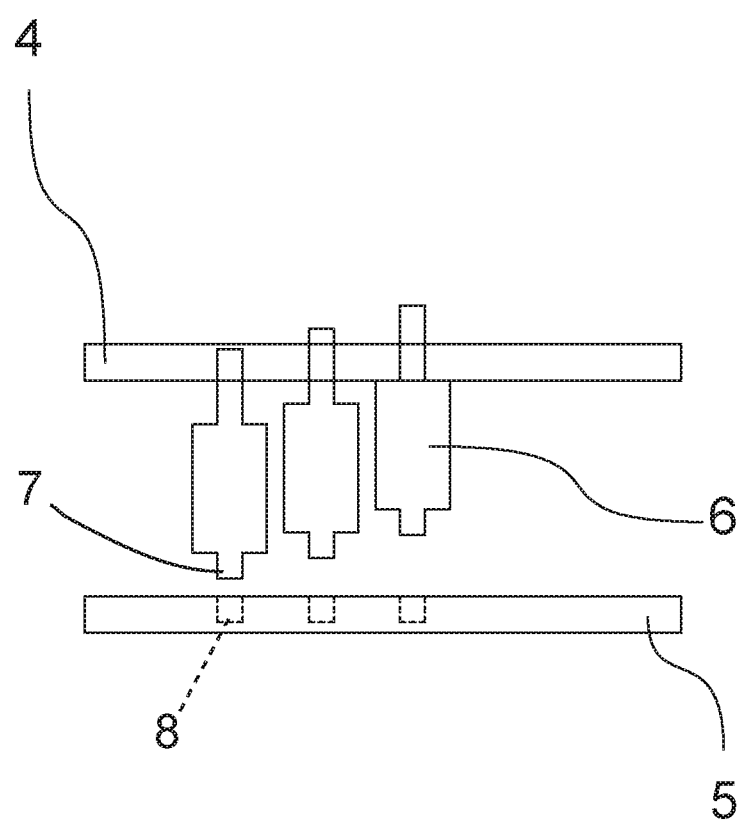
FIGS. 2-6 are schematic views illustrating an installation sequence according to the invention, wherein guide vanes are installed between lower and upper guide wheel rings.
Figure 3:
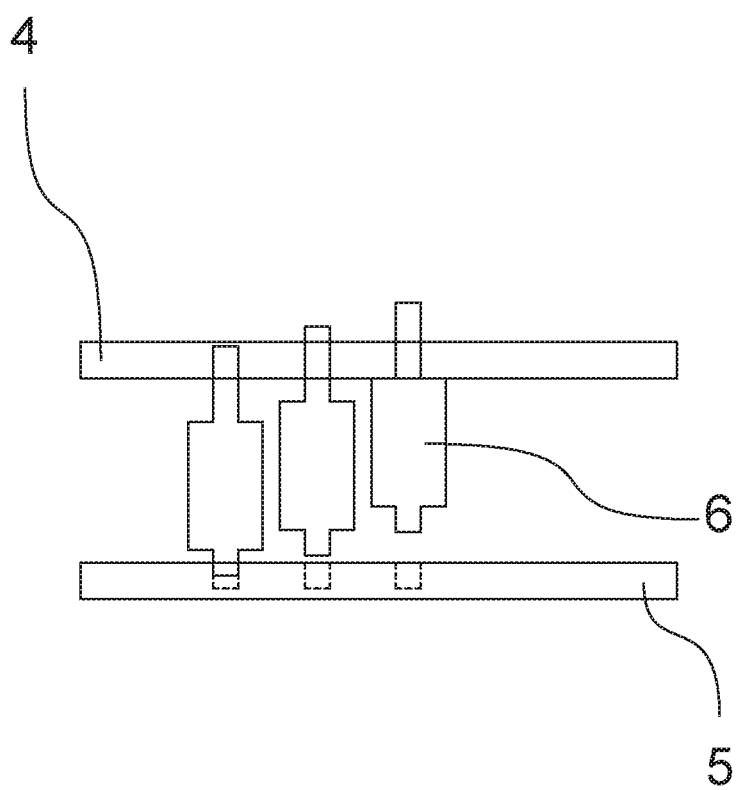
Figure 4:
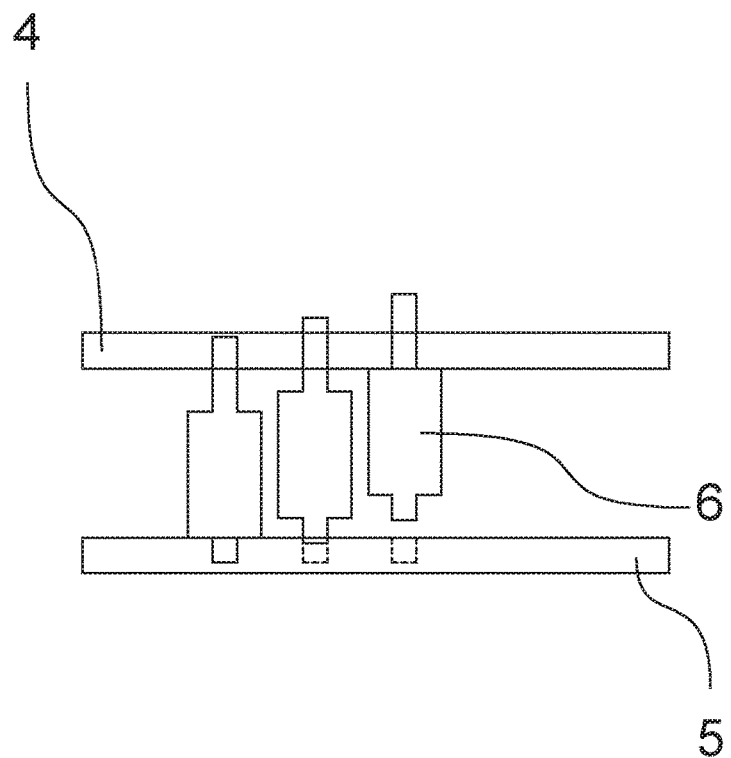
Figure 5:
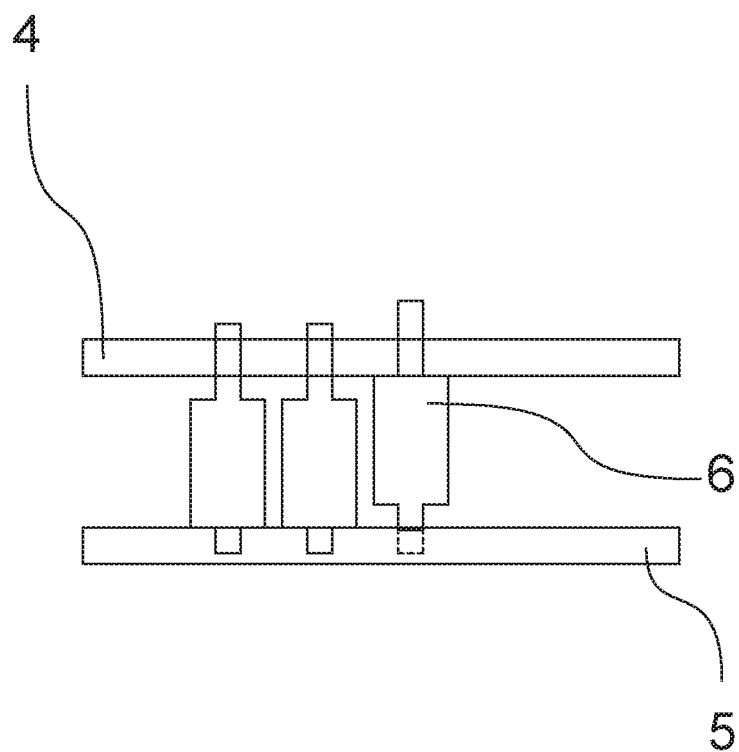
Figure 6:
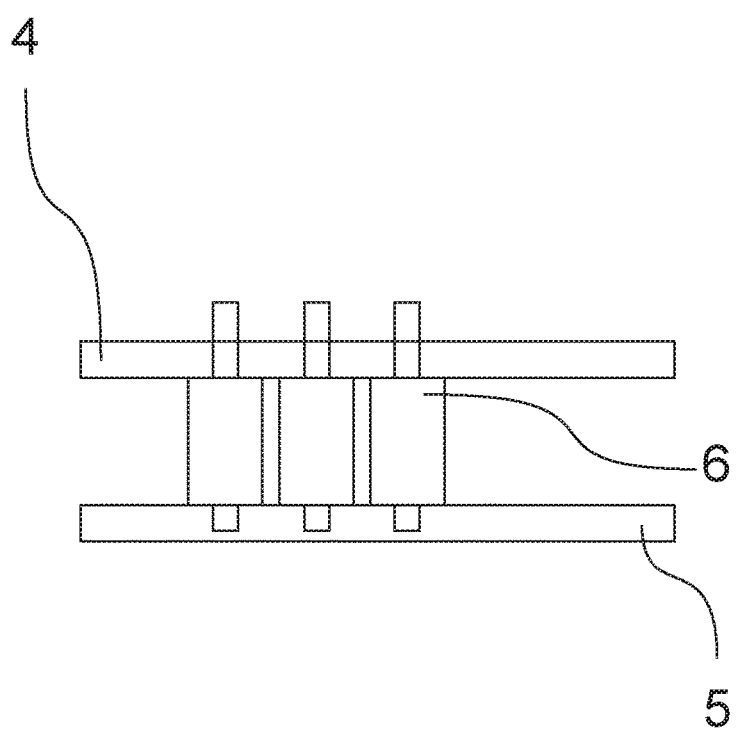

FIG. 1 shows a schematic view of a large hydraulic machine 2 and a guide apparatus 1 mounted in a machine shaft 3. An installation sequence for installing the guide vanes 6 in the turbine rotor is illustrated in FIG. 2 through FIG. 6.

After the lower guide wheel ring 5 has been installed in the machine shaft 3, and possibly also the turbine rotor wheel, the preassembled subassembly is transported with the powerhouse crane to the machine shaft 3, positioned and aligned above the lower guide wheel ring 5, and finally lowered. In the process, the individual guide vanes 6 have to be threaded by their lower spigots 7 into the associated openings 8 of the lower guide wheel ring 5. This process entails several technical difficulties since small deviations (within the scope of the normal manufacturing tolerances) from the ideal arrangement of the guide vanes already make it almost impossible for all the guide vane spigots 7 to be threaded simultaneously into the associated openings 8 of the lower guide wheel ring 5. According to the invention, this problem is solved as follows: before the subassembly is received for installing in the machine shaft 3, the guide vanes 6, suspended in the upper guide wheel ring 4 or in the turbine cover, are lowered so that the lower edge of the lower guide vane spigots 7 comes to lie in each case at a different height. In this case, the term height refers to the position in the direction of the guide vane axes (which in the installed state all extend parallel to the turbine rotational axis) and relative to the upper guide wheel ring 4 or to the turbine cover. The lower edges of the guide vane spigots 7 therefore lie at different heights in each case when each imaginary plane perpendicular to the guide vane axes, which extends through a lower edge of a guide vane spigot 7, just touches this one lower edge and no other lower edge of another guide vane spigot 7.

The described lowering of the guide vanes can for example by carried out by suitable spindles which allow an axial adjustment of the guide vanes. It is clear that the installation of the guide vanes into the subassembly and the lowering of these can be carried out just as easily in one step.

If the subassembly is now lowered over the lower guide wheel ring 5, then first of all only one guide vane spigot 7, specifically the lowermost guide vane spigot 7, has to be inserted into the provided opening 8 of the guide wheel ring 5. With further lowering, the remaining guide vane spigots 7 are inserted in succession, wherein the already inserted spigot ensures an increasingly better guiding of the entire subassembly. In this way, only one spigot 7 is ever inserted at one point in time, which makes the installation of the subassembly appreciably easier.

Naturally, insertion aids (e.g. two-part rings with insertion bevels) can also be used in addition for better threading in.

In practice, it has become apparent that the method also functions well when two or three or four guide vane spigots always come to lie at the same height. In other words, in this case two or three or four spigots always have to be threaded in at the same time when lowering the subassembly. This functions particularly well when the spigots which lie at the same height are as far apart as possible since in this way after threading in the first group of spigots which lie at the same height a very good guiding for further threading in is already achieved. When using two groups, the spigots which lie at the same height should therefore always be selected opposite each other, in the case of three groups should be in an arrangement which forms an approximately equilateral triangle, and in the case of four groups should be in a cross-shaped or approximately square arrangement. If the number of guide vanes does not permit a perfect distribution into the desired groups, the remaining guide vanes can be threaded in any arrangement without any problems at the very end.

It may additionally be mentioned that the described lowering has to be carried out so that an axial sliding of the guide vanes in an upward direction is possible because when the lowermost guide vane spigots are completely threaded into the lower guide wheel ring a further lowering of the subassembly can only be carried out when these completely inserted guide vanes can be displaced in an upward direction relative to the upper guide wheel ring or turbine cover. After the subassembly has been completely lowered, all the guide vanes are therefore located at the same height again. This precondition can be brought about, however, without any problem using the mentioned spindles.

If it is conceded that the threading in of the subassembly requires a slightly longer use of the powerhouse crane, by means of the method according to the invention the availability of the powerhouse crane for other lifting operations compared with the method according to the prior art is significantly increased overall and therefore the installation time of the entire power plant is curtailed.

The invention claimed is:

1. A method for mounting a guide apparatus of a large hydraulic machine with a vertical rotational axis in a machine shaft, the method comprising:
    assembling a subassembly that includes at least an upper guide wheel ring and all guide vanes of the guide apparatus, the assembling step being carried out remotely of the machine shaft;
    mounting the guide vanes in a suspended manner with axes of the guide vanes extending vertically;
    prior to lowering the subassembly into the machine shaft, lowering the guide vanes to differing heights in relation to each other inside the subassembly so that the lowered guide vanes are displaceably in an upward direction;
    providing a lower guide wheel ring with openings for insertion of the guide vanes and installing the lower guide wheel ring in the machine shaft; and
    continuously lowering the subassembly into the machine shaft for installing the subassembly in the machine shaft and, during the lowering, successively inserting the guide vanes that are disposed in the subassembly into the openings provided in the lower guide wheel ring.

2. The method for mounting a guide apparatus according to claim 1, wherein the subassembly further includes a control mechanism of the guide apparatus.

3. The method for mounting a guide apparatus according to claim 1, which comprises lowering two guide vanes of the guide vanes in each case to a common height.

4. The method for mounting a guide apparatus according to claim 1, which comprises lowering three guide vanes of the guide vanes in each case to a common height.

5. The method for mounting a guide apparatus according to claim 1, which comprises lowering four guide vanes of the guide vanes in each case to a common height.

6. The method for mounting a guide apparatus according to claim 1, wherein the step of lowering the guide vanes comprises using spindles for lowering the guide vanes.

* * * * *